(12) United States Patent
Suleimenov et al.

(10) Patent No.: US 12,104,657 B2
(45) Date of Patent: Oct. 1, 2024

(54) AXLE DECOUPLER SYSTEM WITH MECHANICAL SYNCHRONIZER

(71) Applicant: Atieva, Inc., Newark, CA (US)

(72) Inventors: Azat Suleimenov, Santa Clara, CA (US); Jiajun Wu, San Jose, CA (US); Balazs Palfai, Newark, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/484,907

(22) Filed: Oct. 11, 2023

(65) Prior Publication Data

US 2024/0198790 A1 Jun. 20, 2024

Related U.S. Application Data (60) Provisional application No. 63/476,092, filed on Dec. 19, 2022.

(51) Int. Cl.
| | |
|---|---|
| *F16D 23/14* | (2006.01) |
| *B60K 23/06* | (2006.01) |
| *B60K 23/08* | (2006.01) |
| *F16D 11/00* | (2006.01) |
| *F16D 28/00* | (2006.01) |
| *F16D 41/04* | (2006.01) |
| *F16D 41/069* | (2006.01) |
| *F16D 47/04* | (2006.01) |

(52) U.S. Cl.
CPC ............. *F16D 23/14* (2013.01); *F16D 28/00* (2013.01); *B60K 23/06* (2013.01); *B60K 23/08* (2013.01); *F16D 2011/002* (2013.01); *F16D 2023/141* (2013.01); *F16D 41/04* (2013.01); *F16D 41/069* (2013.01); *F16D 47/04* (2013.01)

(58) Field of Classification Search
CPC .... B60K 23/06; B60K 23/08; B60K 17/3515; F16D 2011/002; F16D 23/14; F16D 2023/141; F16D 11/14; F16D 28/00; F16D 41/00–36; F16D 47/04
See application file for complete search history.

(56) References Cited

U.S. PATENT DOCUMENTS

| | | | | |
|---|---|---|---|---|
| 4,805,718 | A | * | 2/1989 | Iwata .............. B60W 30/18145 192/48.92 |
| 5,048,635 | A | * | 9/1991 | Wakabayashi ......... B60K 23/08 192/50 |
| 5,799,749 | A | * | 9/1998 | Yamamoto ............ F16D 41/084 180/247 |
| 5,871,072 | A | * | 2/1999 | Itoh ........................ B60K 23/08 192/85.11 |

(Continued)

*Primary Examiner* — Ernesto A Suarez
*Assistant Examiner* — James J Taylor, II
(74) *Attorney, Agent, or Firm* — Brake Hughes Bellermann LLP (57) ABSTRACT

An axle decoupler system comprises: an axle decoupler configured to selectively couple an axle of a vehicle with a wheel hub of the vehicle, the axle decoupler comprising: a sliding ring having first splines coupled to second splines on the axle, the sliding ring having a first position where the first splines are not also coupled to third splines on the wheel hub, and a second position where the first splines are also coupled to the third splines; and an electric motor for moving the sliding ring into the first or second position; and a one-way clutch coupling the axle and the wheel hub to each other.

13 Claims, 6 Drawing Sheets

(56) References Cited

U.S. PATENT DOCUMENTS

| | | | |
|---|---|---|---|
| 6,082,514 A * | 7/2000 | Averill | F16D 11/10 |
| | | | 192/84.92 |
| 9,649,933 B2 * | 5/2017 | Oram | F16D 1/116 |
| 9,656,548 B2 * | 5/2017 | Averill | B60K 17/344 |
| 10,683,920 B2 | 6/2020 | Palfai et al. | |
| 10,797,562 B2 | 10/2020 | Dlala et al. | |
| 11,005,337 B2 | 5/2021 | Hung et al. | |
| 11,025,113 B2 | 6/2021 | Dlala | |
| 11,105,380 B2 * | 8/2021 | Kathman, Jr. | F16D 27/01 |
| 11,394,270 B2 | 7/2022 | Hung et al. | |
| 11,953,062 B2 * | 4/2024 | Choi | F16D 41/064 |

* cited by examiner

| | 602 | 604 | 606 | 608 | 610 |
|---|---|---|---|---|---|
| | • Motor controller receives command to engage motor | • Rotor speeds up to match reference wheel speed<br>• Motor controller commands one way clutch to preload against wheel hub | • Motor controller commands zero torque<br>• Rotor decelerates<br>• Actuator starts pushing sliding ring to engage<br>• One way chamfer on coupler gear to guide sliding ring to engage | • Sliding ring goes past lead-in chamfer on coupler gear<br>• Actuator pushes sliding ring to its final position | • Motor controller commands full torque |
| Wheel RPM | R1 RPM | R1 RPM | R1 RPM | R1 RPM | R1 RPM |
| Axle RPM | 0 RPM | R1 RPM | R2 RPM | R1 RPM | R1 RPM |
| | No torque in the system | <T2 Nm of preload torque in the system, through sprag clutch | No torque in the system | No torque in the system | T1 Nm motor torque in the system |

AXLE DECOUPLER SYSTEM WITH MECHANICAL SYNCHRONIZER

CROSS-REFERENCE TO RELATED APPLICATION

This application claims benefit, under 35 U.S.C. § 119, of U.S. Provisional Patent Application No. 63/476,092, filed on Dec. 19, 2022, entitled "AXLE DECOUPLER SYSTEM WITH MECHANICAL SYNCHRONIZER", the disclosure of which is incorporated by reference herein in its entirety.

TECHNICAL FIELD

This document relates to an axle decoupler system with a mechanical synchronizer.

BACKGROUND

Some approaches have been tried for selectively decoupling a vehicle wheel from its drive axis. These approaches have been energetically inefficient and distractive to vehicle occupants. For example, existing decouplers are associated with parasitic energy losses and/or noise, vibration and handling (NVH) issues during operation, such as clunking or other drivability concerns.

SUMMARY

In a first aspect, an axle decoupler system comprises: an axle decoupler configured to selectively couple an axle of a vehicle with a wheel hub of the vehicle, the axle decoupler comprising: a sliding ring having first splines coupled to second splines on the axle, the sliding ring having a first position where the first splines are not also coupled to third splines on the wheel hub, and a second position where the first splines are also coupled to the third splines; and an electric motor for moving the sliding ring into the first or second position; and a one-way clutch coupling the axle and the wheel hub to each other.

Implementations can include any or all of the following features. The axle decoupler further comprises a lead screw rotated by the electric motor, the lead screw configured to translate a shift fork that moves the sliding ring into the first or second position. The axle decoupler further comprises a guide pin for the shift fork. The axle decoupler further comprises a first detent for the shift fork on the guide pin. The first detent is a ball detent or a hug ring. The first detent corresponds to the first position, and wherein the axle decoupler further comprises a second detent for the shift fork on the guide pin, the second detent corresponding to the second position. The axle decoupler system comprises at least two one-way clutches coupling the axle and the wheel hub to each other. The axle decoupler further comprises one-way chamfers on the third splines of the wheel hub. The axle decoupler further comprises a first bearing between the axle and the wheel hub. The axle decoupler further comprises a housing, and a second bearing between the housing and the axle. The axle decoupler system further comprises a bushing between the axle and the wheel hub. The axle is a half-shaft of a motor. The half-shaft is included in a constant velocity joint assembly of the motor.

In a second aspect, a method comprises: receiving a first command to engage a motor of a vehicle in which a wheel hub is presently disengaged from an axle of the motor; accelerating, in response to the first command, the axle to a rotational speed of the wheel hub, wherein a one-way clutch coupling the axle and the wheel hub to each other is preloaded; in response to the axle reaching the rotational speed of the wheel hub, commanding zero torque from the motor, wherein the axle decelerates, and moving a sliding ring coupled to the axle toward engagement with the wheel hub; completing the engagement between the sliding ring and the wheel hub, wherein the axle and the wheel hub have a common rotational speed; and after the engagement between the sliding ring and the wheel hub is completed, commanding torque from the motor according to the first command.

Implementations can include any or all of the following features. A rotational speed of the axle is zero when the first command is received. The sliding ring is moved by rotating a lead screw configured to translate a shift fork that moves the sliding ring between first and second positions. A first detent for the shift fork on a guide pin corresponds to the first position. A second detent for the shift fork on the guide pin corresponds to the second position. Completing the engagement between the sliding ring and the wheel hub is facilitated by one-way chamfers on splines of the wheel hub, the one-way chamfers causing the sliding ring to move opposite to a direction of rotation of the sliding ring and the wheel hub. The method further comprises receiving a second command to disengage the wheel hub from the axle, and in response to the second command moving the sliding ring in an opposite direction toward disengagement from the wheel hub.

BRIEF DESCRIPTION OF DRAWINGS

FIG. 6 shows an example of a control strategy for a motor.

Like reference symbols in the various drawings indicate like elements.

DETAILED DESCRIPTION

This document describes examples of systems and techniques providing an axle decoupler system with a mechanical synchronizer. In some implementations, a decoupler system allows disconnection of a non-driven axle on the vehicle. This can eliminate parasitic losses of the decoupled axle and improve full vehicle efficiency. During the engagement, a mechanical synchronizer can equilibrate the speed of a half-shaft to the speed of the corresponding wheel. This can provide smooth coupling and therefore improve NVH issues. The present subject matter can make an axle decoupler system smaller in the vehicle design and less noticeable to the occupant. For example, an axle decoupler system can allow the vehicle to engage a currently disengaged wheel as fast as the motor can accelerate components up to speed, with minimum disruption to the occupant.

Ensuring the effectiveness of a decoupler system may be an important aspect of maximizing vehicle efficiency. Regarding the decoupler system, its efficiency, the repeatability of decoupling and recoupling, its response time, and the smoothness of its operation are all factors that can be considered in the mechanical design. For example, the above characteristics can help maximize the operating windows where the decoupler system can be used in eliminating parasitic losses of a decoupled axle.

Decoupler systems according to the present subject matter can temporarily draw electrical power from the vehicle to energize a rotational motor which pushes and pulls an intermediate gear to perform the primary function of coupling and decoupling between splines on half shafts and splines on wheels. For example, this can be done via a set of self-locking lead/ball screw set. Once the intermediate gear is in either the coupled or the decoupled position, a set of ball detents can ensure that the decoupler system does not consume additional power to remain in the coupled or decoupled state.

In the coupled state, a decoupler system can use a combination of spline connections between the half shaft, the intermediate gear, and the output gear, as well as over-running clutches to transfer drive unit output torque from the half shafts to the vehicle wheels. In the decoupled state, the intermediate gear can disconnect from the wheel and the over-running clutch can spin freely.

During engagement, the torque transfer capability of the over-running clutches can allow a control strategy which uses drive unit output torque to establish preload between the half shaft and the wheel to ensure the speeds are synchronized between them. This can be combined with a one-way chamfer geometry.

Implementations can provide one or more of the following advantages. A mechanical synchronizer (e.g., sprag clutch) can equilibrate rotational speed of the axle to the wheel during a coupling scenario. For example, the use of over-running clutches can improve decoupling/recoupling repeatability, response time, and/or smoothness during spline connection engagement. A coupling gear profile with a one-way chamfer can prevent overloading of the decoupler-system motor during a teeth condition sometimes referred to as a dog-on-dog situation (i.e., splines of gears rotating at the same speed do not presently mesh with each other). Low-friction bearings, seal, bushing, and/or sprag clutch can be used to minimize parasitic losses in both coupled and decoupled states. A bearing arrangement can be used that reacts to half-shaft forces. A self-locking screw and gearbox can be used to eliminate electrical power draw during the engaged and disengaged states.

Examples described herein refer to a vehicle. A vehicle is a machine that transports passengers or cargo, or both. A vehicle can have one or more electric motors. Examples of vehicles include, but are not limited to, cars, trucks, buses, motorcycles, and scooters. The number of wheels can differ between types of vehicles, and one or more (e.g., all) of the wheels can be used for propulsion of the vehicle. The vehicle can include a passenger compartment accommodating one or more persons. A vehicle can be powered exclusively by electricity, or can use one or more other energy source in addition to electricity, or can have an internal combustion engine (ICE), to name just a few examples.

Examples described herein refer to a motor. A motor can be an electric motor or an ICE. An electric motor as used herein can be any type of electric motor, including, but not limited to, a permanent-magnet motor, an induction motor, a synchronous motor, or a reluctance motor.

Figure 1:
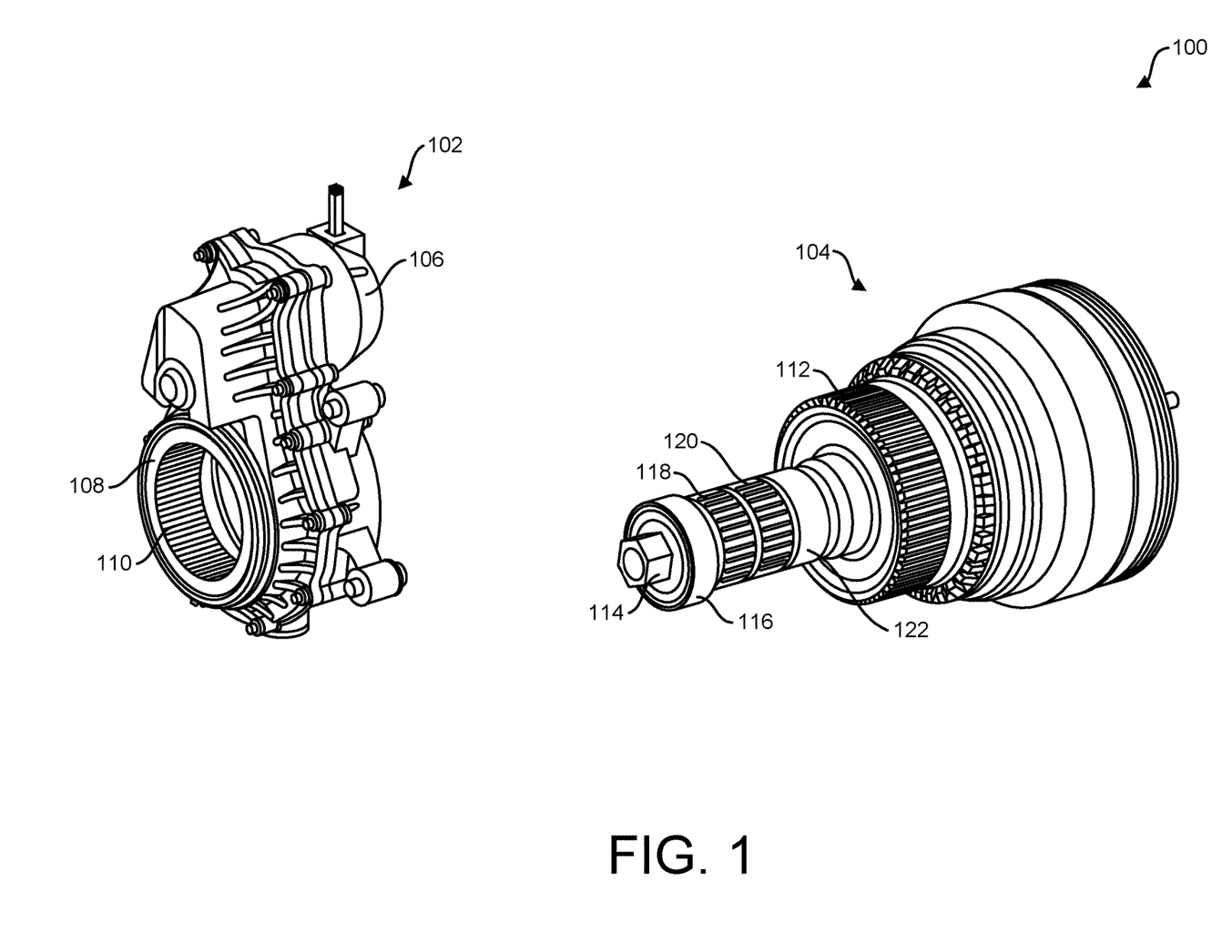
FIG. 1 shows an example of an axle decoupler system.
Figure 2:
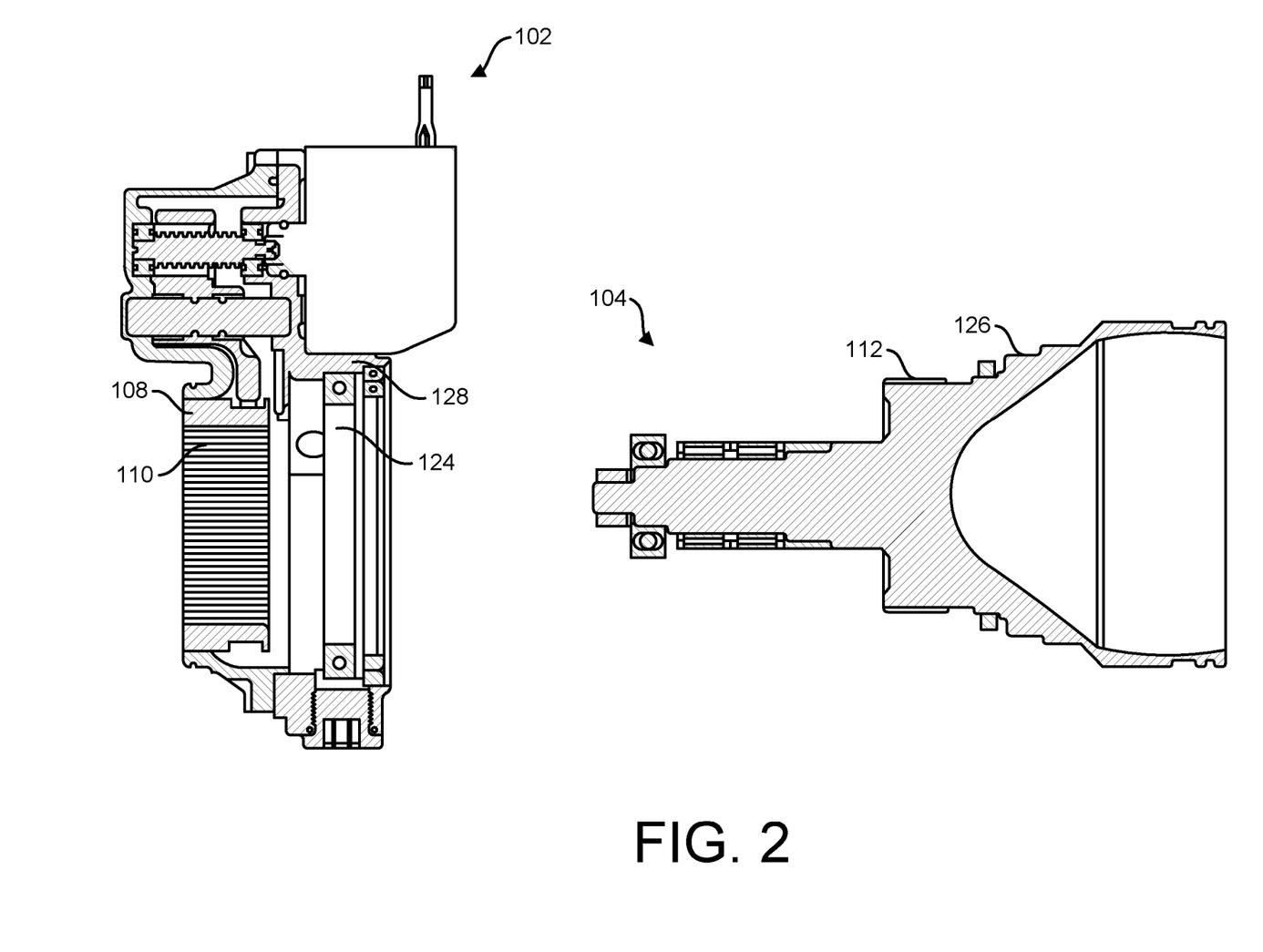
FIG. 2 shows examples of cross sections of the axle decoupler and the CV joint assembly of the axle decoupler system in FIG. 1.

FIG. 1 shows an example of an axle decoupler system 100. The axle decoupler system 100 can be used with one or more other examples described elsewhere herein. The axle decoupler system 100 includes an axle decoupler 102 and an axle to be coupled to or decoupled from a wheel by the axle decoupler 102, including but not limited to an outer constant velocity (CV) joint assembly 104. FIG. 2 shows examples of cross sections of the axle decoupler 102 and the CV joint assembly of the axle decoupler system in FIG. 1. The axle decoupler 102 and the outer CV joint assembly 104 are shown separate from each other in the illustration for clarity. In the following examples, components are sometimes described as being included in either of the components of the axle decoupler system 100; this is based on how the axle decoupler system 100 happens to be disassembled in the present exemplary illustration. For example, certain components can be coupled to both the axle decoupler 102 and the outer CV joint assembly 104 when the axle decoupler system 100 has been assembled. In some implementations, the axle coupled/decoupled by the axle decoupler 102 can be a half shaft of a traction axle in a vehicle. For example, the half shaft can be included in the outer CV joint assembly 104.

The axle decoupler 102 includes an electric motor 106 that will be used in coupling/decoupling the axle. In some implementations, the electric motor 106 can be a rotary electric motor. For example, the electric motor 106 is powered by the battery pack of an electric vehicle, or by the electrical system in an ICE vehicle.

The axle decoupler 102 includes a sliding ring 108 having splines 110 oriented radially inward. The splines 110 can be coupled with splines 112 of the outer CV joint assembly 104, oriented radially outward, both when the axle is coupled to the wheel and when it is decoupled from the wheel.

The outer CV joint assembly 104 can include, among other features, an axle nut 114, a bearing 116, one or more one-way clutches 118 and 120 (e.g., sprag clutches), and a pilot bushing 122. When the axle decoupler system 100 is assembled (i.e., when part of the outer CV joint assembly 104 partially extends through the opening of the axle decoupler 102), the bearing 116, the one-way clutches 118 and 120, and the pilot bushing 122 can all be positioned against interior surfaces of a wheel hub (to be described below). As such, the one-way clutches 118 and 120 can couple the outer CV joint assembly 104 and the wheel hub to each other. For example, the one-way clutches 118 and 120 can ensure that a currently slow part (e.g., the outer CV joint assembly 104), when being accelerated, does not over-accelerate a currently faster part (e.g., the wheel hub).

The axle decoupler 102 can include a bearing 124. When the axle decoupler system 100 is assembled, an inner race of the bearing 124 can abut a surface 126 of the outer CV joint assembly 104, and an outer race of the bearing 124 can abut a housing 128 of the axle decoupler 102. Having at least two bearings in the axle decoupler system 100 (e.g., the bearings 116 and 124, and optionally the pilot bushing 122) can allow the axle decoupler system 100 to react a force vector from the outer CV joint assembly 104, which force may have a component in the y direction of the vehicle coordinate system (i.e., a vertical direction). For example, the bearings can prevent overloading due to a half shaft plunge force vector and can thereby prevent excessive force on the one-way clutches 118 and 120. Having low friction bearings, bushings and one-way clutches helps minimize losses.

Figure 3:
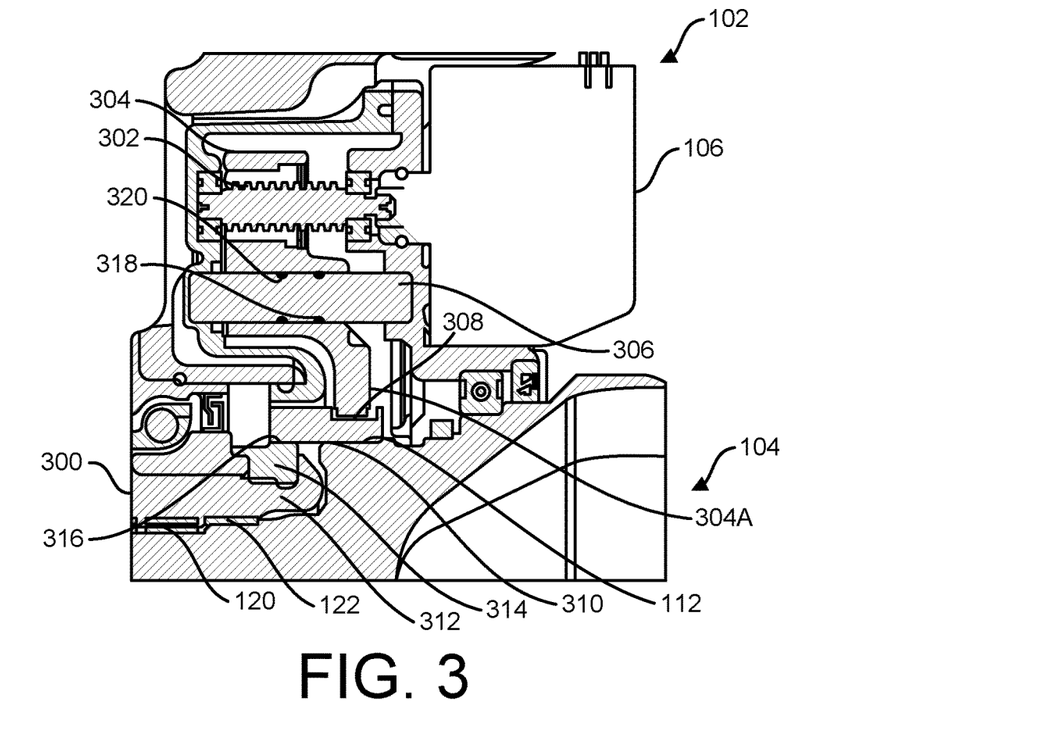
FIG. 3 shows an example of a partial cross section of the axle decoupler system in FIG. 1 when the axle is coupled to a wheel hub.

FIG. 3 shows an example of a partial cross section of the axle decoupler system 100 in FIG. 1 when the axle is coupled to a wheel hub 300. As such, the axle decoupler system 100 is here assembled and only a part of the axle decoupler system 100 is shown for clarity. The axle decoupler 102 has a lead screw 302 coupled to the electric motor 106, which can rotate the lead screw 302 in either direction. A shift fork 304 engages with the threads of the lead screw 302 and can be translated in either direction based on the rotation of the lead screw 302. The shift fork 304 has a fork portion 304A that is involved in the coupling and decoupling by the axle decoupler system 100, to be exemplified below. The shift fork 304 can ride on a guide pin 306 that extends along the direction of translational movement. As such, the axle decoupler 102 can have the lead screw 302 rotated by the electric motor 106, and the lead screw 302 can be configured to translate the shift fork 304 which can ride on the guide pin 306.

The axle decoupler system 100 includes a sliding ring 308 that is moveable in a left-right direction in the present illustration. The sliding ring 308 has splines 310 oriented radially inward that are coupled to the splines 112 on the outer CV joint assembly 104. That is, the splines 310 may be coupled to the splines 112 in all positions that the sliding ring 308 assumes. The wheel hub 300, which is partially shown, has a flange 312 that can be essentially rotationally symmetric about the axle. One or more components can be positioned between the wheel hub 300 and the outer CV joint assembly 104. For example, the pilot bushing 122 and the one-way clutch 120 are here visible and can abut the flange 312. The wheel hub 300 can have a coupler gear 314 mounted to the flange 312. The coupler gear 314 has splines 316 oriented radially outward. The sliding ring 308 is currently positioned so that the splines 310 are coupled to the splines 316. The position is directed by the current position of the fork portion 304A. As such, the outer CV joint assembly 104 is presently coupled to and engaged with the wheel hub 300. Motor torque applied to the outer CV joint assembly 104 can therefore drive the wheel of the wheel hub 300.

To avoid the occurrence of an indeterminate condition where the shift fork 304 is inadvertently pushed back or forth on the guide pin 306, or the lead screw 302 rotated, the guide pin 306 can make the operational states determinate and thereby create stable states. One or more detents 318 or 320 can be used to ensure that the shift fork 304 remains in the intended position until the position is deliberately changed. Any of multiple types of detent can be used, including a ball detent or a hug ring. For example, the detent 320 corresponds to the engaged position (shown in FIG. 3), and the detent 318 corresponds to the disengaged position described next.

Figure 4:
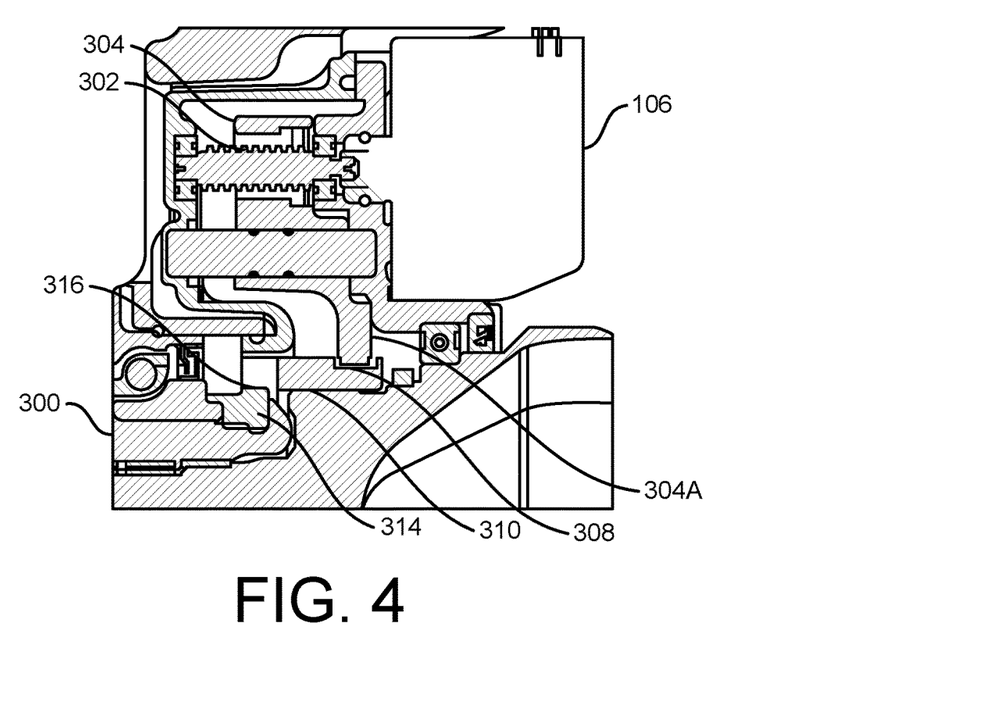
FIG. 4 shows another example of the partial cross section of the axle decoupler system in FIG. 1 when the axle is decoupled from the wheel hub.

FIG. 4 shows another example of the partial cross section of the axle decoupler system 100 in FIG. 1 when the axle is decoupled from the wheel hub 300. The electric motor 106 has rotated the lead screw 302 to translate the shift fork 304 in a direction to the right in the illustration, compared to the state shown in FIG. 3. The fork portion 304A has moved the sliding ring 308 to the right. The splines 310 of the sliding ring 308 no longer engage with the splines 316 of the coupling gear 314. As such, the outer CV joint assembly 104 is presently not coupled to, and disengaged from, the wheel hub 300. The motor can therefore not presently drive the wheel of the wheel hub 300. Moreover, rotation of the wheel hub 300 does not presently cause rotation of the axle of the outer CV joint assembly 104.

The above examples illustrate that an axle decoupler system (e.g., the axle decoupler system 100) can include an axle decoupler (e.g., the axle decoupler 102) configured to selectively couple an axle of a vehicle (e.g., the outer CV joint assembly 104) with a wheel hub (e.g., the wheel hub 300) of the vehicle. The axle decoupler can include a sliding ring (e.g., the sliding ring 308) having first splines (e.g., the splines 310) coupled to second splines (e.g., the splines 112) on the axle. The sliding ring has a first position (e.g., as shown in FIG. 4) where the first splines are not also coupled to third splines (e.g., the splines 316) on the wheel hub, and a second position (e.g., as shown in FIG. 3) where the first splines are also coupled to the third splines.

Figure 5:
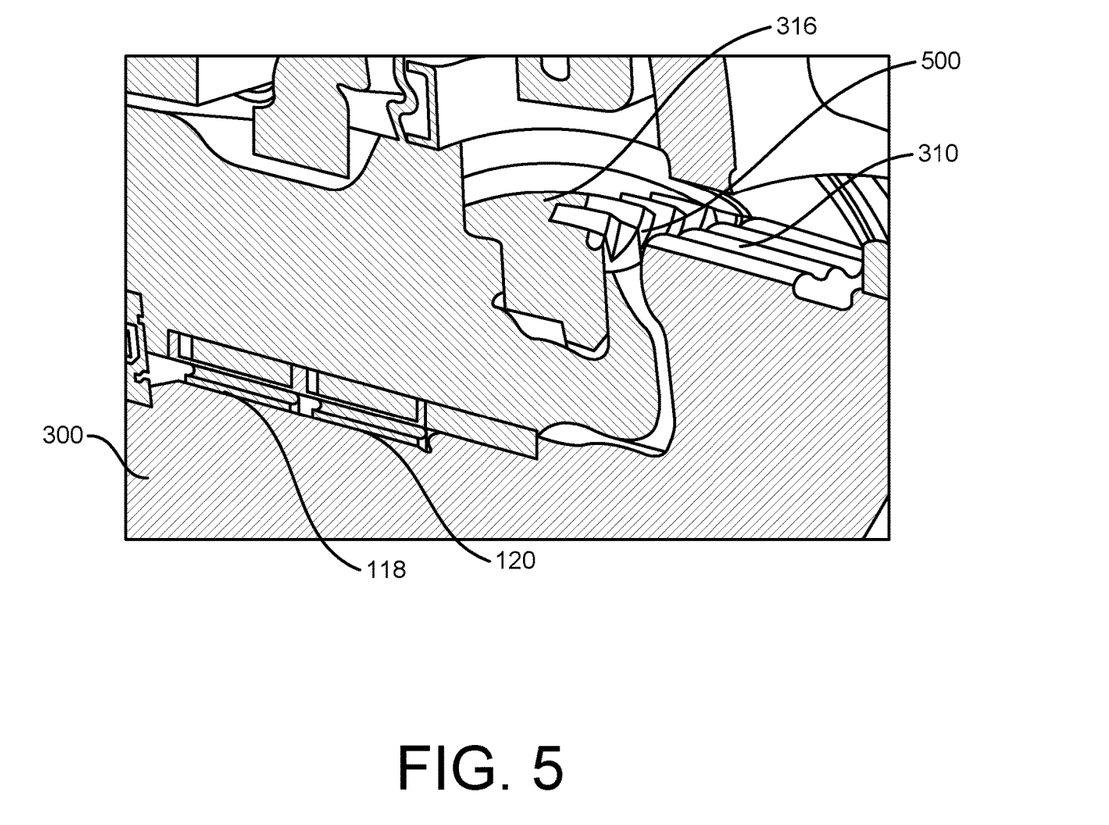
FIG. 5 shows an example of a partial cross section of the axle decoupler system in FIG. 1.

FIG. 5 shows an example of a partial cross section of the axle decoupler system 100 in FIG. 1. In this illustration, the sliding ring 308 (e.g., FIGS. 3-4) is omitted for clarity. As such, the splines 310 on the outer CV joint assembly 104 and the splines 316 on the wheel hub 300 are visible in this perspective view.

One challenge in the engagement operation can be that the splines 310 and 316 are not always in mesh when the outer CV joint assembly 104 and the wheel hub 300 are rotating at the same speed. If they are out of mesh when the splines 310 and 316 should engage with each other, some additional feature can be utilized. Here, one-way chamfers 500 can be formed on some or all of the splines 316. When the sliding ring is pushed toward engagement, the one-way chamfers 500 allow the sliding ring to move only in the opposite direction of the rotation, that is, in the negative direction. By contrast, if the sliding ring, which remains coupled to the outer CV joint assembly 104, were required to move in the positive direction this would also cause additional rotation of the outer CV joint assembly 104. Such additional rotation would put additional load on the one-way clutches 118 and 120, and a stronger motor than the electric motor 106 may be needed. Instead, with the one-way chamfers 500, the engagement will decrease the load on the one-way clutches 118 and 120.

FIG. 6 shows an example of a control strategy 600 for a motor. The control strategy 600 can be used with one or more other examples described elsewhere herein. The control strategy 600 illustrates examples of states 602-610 that can occur while engaging an axle to a wheel hub. As will be described in the examples below, full engagement occurs only at the end of the control strategy 600 (e.g., in the transition between the states 608 and 610). For each state, the revolutions per minute (RPM) of the wheel and the axle are listed, and graphs of the axle RPMs, motor torque, and engagement position of the sliding ring, are presented.

The state 602 can occur while the wheel has been disengaged from the axle to conserve energy. The wheel can be at R1 RPM (e.g., corresponding to the vehicle traveling at some ordinary level of speed), while the axle is currently at zero RPM. There may be no torque in the system given that the wheel is decoupled. In the state 602, a motor controller can receive a command to engage a motor of a vehicle. For example, the driver can command an amount T1 newton meters (Nm) of torque (e.g., 100% of available torque).

In the state 604, the rotor of the motor can be sped up to match the reference speed of the wheel, as a result of the motor applying torque as indicated by a graph 612. The wheel can therefore remain at R1 RPM, and the axle can accelerate from zero to R1 RPM, as indicated by a graph 614. In doing so, the motor controller can cause the one-way clutch(es) to preload against the wheel hub in an amount of less than T2 Nm. For example, T2 is significantly smaller than T1.

In the state 606, the motor controller commands zero torque as indicated by the graph 612, so there is no torque in the system. The rotor therefore decelerates as indicated by the graph 614. The axle can decrease from R1 RPM to R2 RPM, where R2 is lower than but substantially equal to R1. The wheel can remain at R1 RPM. The actuator (e.g., the fork portion 304A in FIG. 3) begins moving the sliding ring to engage with the coupling gear of the wheel hub. A graph 616 indicates that the engagement position of the sliding ring has increased but is not yet fully engaged. For example, a one-way chamfer on the coupler gear can guide the sliding ring to engage.

In the state 608, the splines of the sliding ring can go past the lead-in chamfer on the coupler gear. Accordingly, the actuator can move the sliding ring to its final position as indicated by the graph 616. The wheel and the axle can now both be at R1 RPM (i.e., they have a common rotational speed), and there is no torque in the system. That is, completing the engagement between the sliding ring and the wheel hub can be facilitated by the one-way chamfers causing the sliding ring to move opposite to a direction of rotation of the sliding ring and the wheel hub.

In the state 610, the motor controller can command the full requested torque. As such, T1 Nm of torque can be generated in the system as indicated by the graph 612. The wheel and the axle can now both be at R1 RPM.

The control strategy 600 can include subsequently disengaging the axle and the wheel hub from each other. This can correspond to changing from the example situation shown in FIG. 3 to the example situation shown in FIG. 4. With essentially no torque on the motor, the sliding ring can be moved in the opposite direction compared to during engagement.

Figure 7:
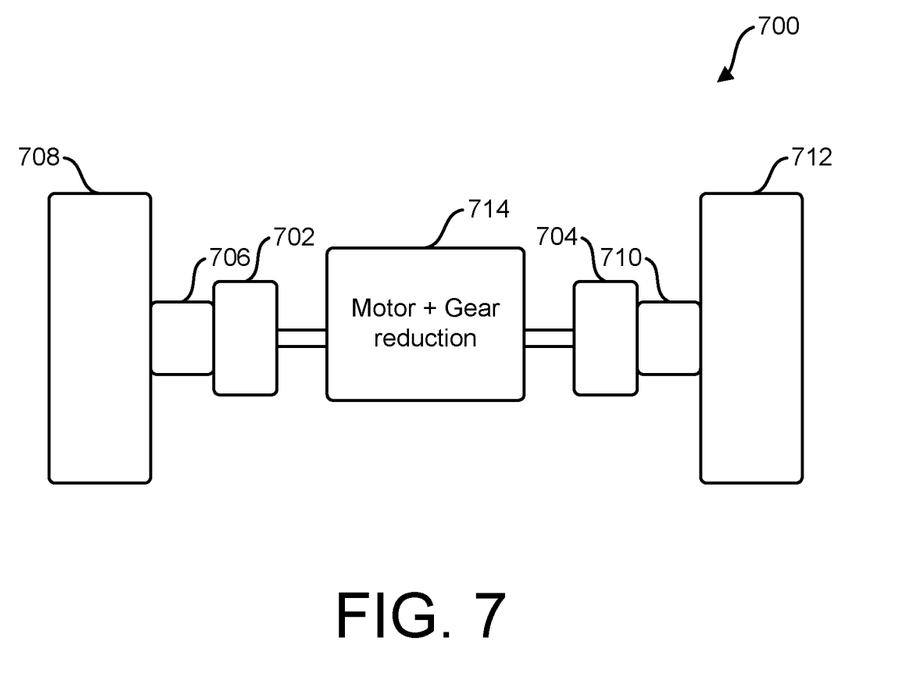
FIG. 7 schematically shows an example of a vehicle axle with two axle decoupler systems.

FIG. 7 schematically shows an example of a vehicle axle 700 with two axle decoupler systems 702 and 704. Each of the axle decoupler systems 702 and 704 can be substantially similar or identical to the axle decoupler system 100 in FIG. 1. The axle decoupler system 702 is coupled to a wheel hub 706 of a wheel 708, and the axle decoupler system 704 is coupled to a wheel hub 710 of a wheel 712. The vehicle axle 700 can be driven by one or more motor units 714. For example, the motor unit(s) 714 can also provide gear reduction. As such, two axle decoupler systems can be used per axle. For example, the vehicle axle 700 can be a rear or front axle in the vehicle.

Figure 8:
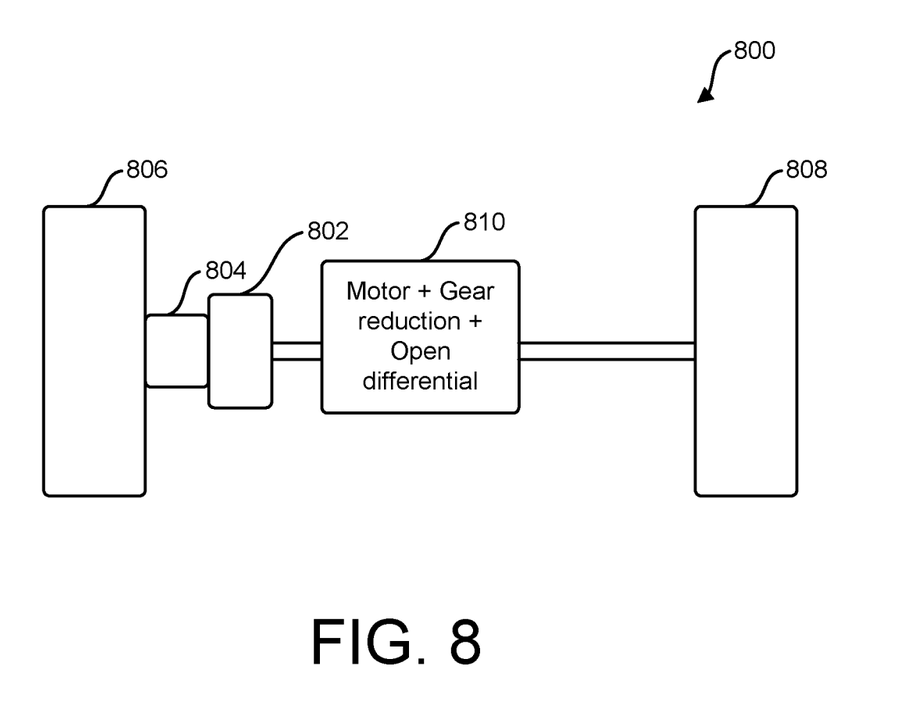
FIG. 8 schematically shows an example of a vehicle axle with one axle decoupler system.

FIG. 8 schematically shows an example of a vehicle axle 800 with one axle decoupler system 802. The axle decoupler system 802 can be substantially similar or identical to the axle decoupler system 100 in FIG. 1. The axle decoupler system 802 is coupled to a wheel hub 804 of a wheel 806. Another wheel 808, by contrast, may not have an axle decoupler system. The vehicle axle 800 can be driven by one or more motor units 810. For example, the motor unit(s) 810 can also provide gear reduction and have an open differential. As such, one axle decoupler system can be used on an axle. For example, the vehicle axle 800 can be a rear or front axle in the vehicle.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An axle decoupler system comprising:
   an axle decoupler configured to selectively couple an axle of a vehicle with a wheel hub of the vehicle, the axle decoupler comprising:
   a sliding ring having first splines coupled to second splines on the axle, the sliding ring having a first position where the first splines are not coupled to third splines on the wheel hub, and a second position where the first splines are coupled to the third splines; and
   an electric motor for moving the sliding ring into the first or second position; and
   a one-way clutch coupling the axle and the wheel hub to each other.

2. The axle decoupler system of claim 1, wherein the axle decoupler further comprises a lead screw rotated by the electric motor, the lead screw configured to translate a shift fork that moves the sliding ring into the first or second position.

3. The axle decoupler system of claim 2, wherein the axle decoupler further comprises a guide pin for the shift fork.

4. The axle decoupler system of claim 3, wherein the axle decoupler further comprises a first detent for the shift fork on the guide pin.

5. The axle decoupler system of claim 4, wherein the first detent is a ball detent or a hug ring.

6. The axle decoupler system of claim 4, wherein the first detent corresponds to the first position, and wherein the axle decoupler further comprises a second detent for the shift fork on the guide pin, the second detent corresponding to the second position.

7. The axle decoupler system of claim 1, wherein the one-way clutch is one of at least two one-way clutches coupling the axle and the wheel hub to each other.

8. The axle decoupler system of claim 1, wherein the axle decoupler further comprises one-way chamfers on the third splines of the wheel hub.

9. The axle decoupler system of claim 1, wherein the axle decoupler further comprises a first bearing between the axle and the wheel hub.

10. The axle decoupler system of claim 9, wherein the axle decoupler further comprises a housing, and a second bearing between the housing and the axle.

11. The axle decoupler system of claim 9, further comprising a bushing between the axle and the wheel hub.

12. The axle decoupler system of claim 1, wherein the axle is a half-shaft of a motor.

13. The axle decoupler system of claim 12, wherein the half-shaft is included in a constant velocity joint assembly of the motor.

\* \* \* \* \*